UNITED STATES PATENT OFFICE.

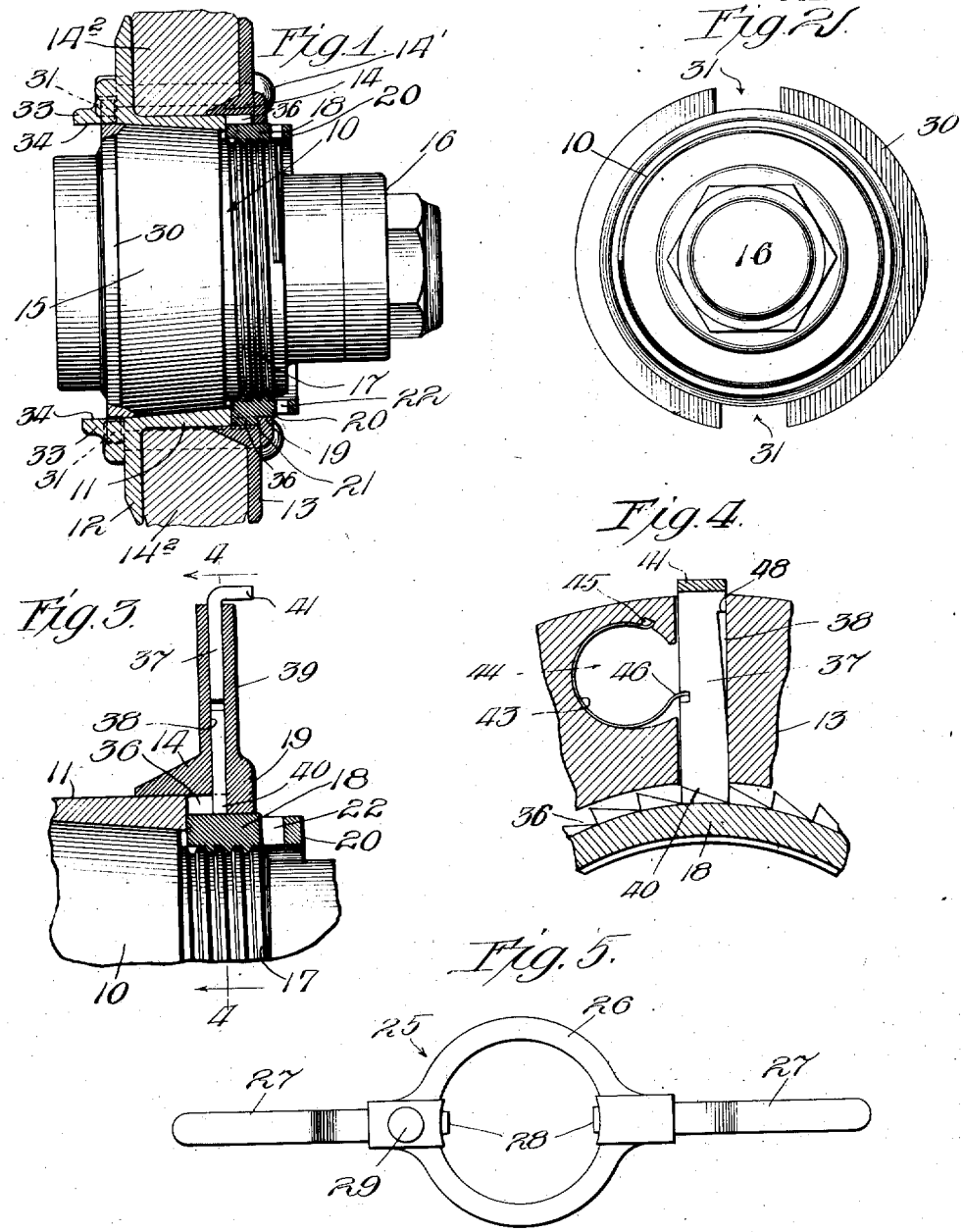

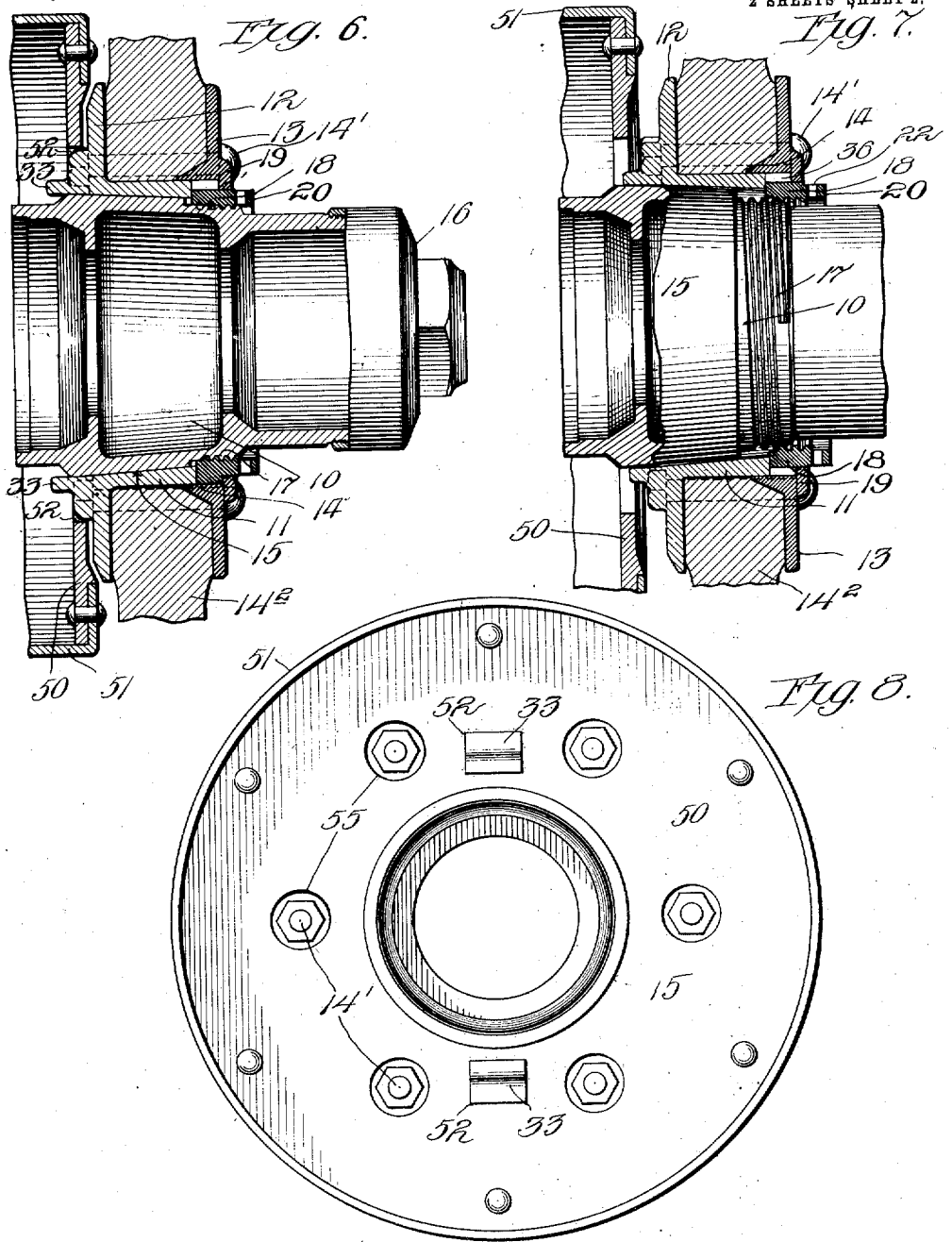

THOMAS I. DUFFY, OF CHICAGO, ILLINOIS, ASSIGNOR TO HENRY ELLSWORTH AND ALBERT E. CROSS, BOTH OF CHICAGO, ILLINOIS, COPARTNERS DOING BUSINESS UNDER THE FIRM-NAME OF ELLSWORTH & CROSS.

HUB FOR DEMOUNTABLE WHEELS.

1,076,558.　　　Specification of Letters Patent.　　Patented Oct. 21, 1913.

Application filed December 13, 1911. Serial No. 665,442.

*To all whom it may concern:*

Be it known that I, THOMAS I. DUFFY, a citizen of the United States, and a resident of Chicago, in the county of Cook and State of Illinois, have invented certain new and useful Improvements in Hubs for Demountable Wheels; and I do hereby declare that the following is a full, clear, and exact description thereof, reference being had to the accompanying drawings, and to the characters of reference marked thereon, which form a part of this specification.

This invention relates to improvements in hubs for demountable wheels, of that kind embracing an inner member which is removably carried by the vehicle axle in the manner of an ordinary wheel hub, and an outer member which carries the spokes, the felly and tire; the arrangement being such that when the tire is injured or disabled the outer hub member carrying the principal parts of the wheel may be removed and another part-wheel with a perfect tire thereon substituted.

Among the objects of the invention are to provide a wheel of this character which may be readily and practically constructed with standard tools found in the ordinary shop, whereby the hub may be economically constructed.

A further object of the invention is to provide an improved construction of this character in which the hub parts may be quickly and accurately assembled and may be quickly dismounted by the use of a simple implement.

Further objects of the invention are to provide improvements in the details in the construction of the hub as will hereinafter more fully appear and the invention consists in the matters hereinafter set forth and more particularly pointed out in the appended claims.

In the drawings:—Figure 1 is a view partly in elevation and partly in section of a demountable hub embodying my invention the same being shown as a front hub. Fig. 2 is a front end view of the inner member of said hub. Fig. 3 is a sectional detail illustrating a method of locking the locking ring or nut in place. Fig. 4 is a sectional detail on the line 4—4 of Fig. 3. Fig. 5 is a side elevation of a special form of wrench for turning the locking ring on and off. Fig. 6 is a side elevation, with parts in section, of a rear or driving hub embodying my improvements. Fig. 7 is a similar section, partly broken away showing the hub members in the course of being assembled. Fig. 8 is a rear end elevation of the hub, shown in Fig. 6.

First referring to the construction of the hub shown in Figs. 1 to 4, inclusive, which may constitute the hub of the front wheel of an automobile, said hub embraces as its principal elements an inner hub member 10, which is shown as interiorly fashioned to receive the anti-friction bearings of the shaft or axle mounted in the hub, and an outer member or shell 11 which is fitted over the inner member and is arranged to carry the rim, spokes and tire of the wheel. The said outer member is provided with spoke flanges 12, 13, the former or rear flange being shown as being made integral with the rear end of the outer hub member. The front or outer flange 13, is removably fitted over said outer member, it being shown as having an annular rearwardly extending flange 14 that has a tight slip fit over the front end of the outer member, as shown in Figs. 1 and 3. The flanges are apertured to receive the clamping bolts 14' by which the spokes $14^2$ are clamped between the flanges.

The inner hub member 10 is formed at its rear end with an exterior taper or cone-like surface 15, said member being made largest at its rear end, and the outer shell or member 11 is formed with an interior taper or cone-like surface complemental to and adapted to fit over the tapered portion of the inner member. The said inner member 10 is shown as elongated beyond the outer member to provide the usual space to receive the end of the axle or driving shaft, and is exteriorly screw-threaded at its front end to receive the usual dust cap 16 which closes the front end of the hub. The said front end of the inner member is made of a diameter to permit the outer member of the hub to freely pass thereover when applying the said outer member to or removing it from the inner hub member. The inner hub member is provided at the smaller end of its taper 15 with an exterior screw-thread 17 over which engages an interiorly screw-threaded locking ring or nut 18, which is arranged when turned inwardly to bear against the adjacent end of the outer member in a manner to force the tapered or cone-like portions of said members into wedging engagement, and thereby lock the hub members from relative rotation.

The spoke flange 13 is formed at its inner margin, exterior to the flange 14, with an annular flange 19 which terminates short of the inner hub member and is spaced a distance from the inner hub member to provide an annular space, forwardly through which extends an annular flange 20 of the locking ring 18; said flange of the locking ring extending a short distance beyond the base of the spoke flange. The spoke flange is formed in rear of the flanged portion 19 thereof with an annular recess to receive the locking ring 18. The arrangement of said annular recess to receive the locking ring and the extension of the flange 20 beyond the base of the spoke flange for engagement with a wrench or like instrument, provides an interlocking or swiveling connection between the locking ring and outer hub member (embracing in part thereof the removable spoke flange) by which said locking ring serves when turned rearwardly to force the hub members together and, when turned forwardly, to withdraw the outer hub member from the inner hub member, thus avoiding the necessity of providing a special pulling device for removing the outer hub member and the parts of the wheel carried thereby.

As herein shown the flanged member 20 of the locking ring 18 is provided with diametrically opposed spanner holes 22 (Figs. 1 and 3) adapted to be engaged by a suitable implement, as the wrench 25, shown in Fig. 5. The said wrench embraces a ring member 26 having the oppositely disposed handles 27, 27 connected thereto so that the inner end 28, 28 thereof extends inwardly beyond the inner margin of the ring member to constitute spanner lugs. One of the handles 27 is fixed to the ring member while the other is adapted to be adjustably locked thereto by the set screw 29. The engagement of the wrench is effected by releasing the set screw 29 and withdrawing one of the handles 27 and its lug 28 such a distance as to permit the ring member to pass over the flange 20 of the locking ring. The fixed lug 28 is engaged with one of the spanner holes 22, after which the movable handle and lug are moved inwardly to engage the latter lug with the other spanner hole 22. The arrangement described constitutes a simple and readily applied means for connecting the wrench with the locking ring in such a way as to avoid slipping of the wrench on the ring.

The locking ring 18 is assembled on the outer hub member by applying the ring to the recessed portion of the removable spoke flange 13 before said flange is assembled on the hub. Thereafter said spoke flange is pressed into place on the outer hub member to confine the locking ring between the flanged portion 19 thereof and the end face of the outer hub member. By making the outer spoke flange 13 removable in this manner, I provide an exceedingly simple, strong and efficient construction for mounting the combined locking and pulling ring in place, and also a construction which enables the parts to be made and assembled at relatively small cost. This construction also enables the locking ring to be housed and protected from injury, as by contact with external objects, such as would tend to injure the screw-threaded connection of the locking ring or nut with the inner hub member. Furthermore the location of the locking ring or member as shown, a distance rearwardly from the end of the hub, serves to additionally protect the locking ring from injury.

In order to prevent relative rotation of the hub members in case the screw-threaded or other locking means should not be tightened or brought up sufficiently to properly wedge the tapered or cone-like surfaces of the members together, I may provide an interlocking connection between the inner and outer hub members which is made as follows. The inner hub member is provided at its rear end face with a flange 30 formed with a plurality of notches 31, two of such notches, diametrically opposed to each other, being shown in Fig. 2. The outer hub member is provided on its rear end face with lugs 33, 33 arranged to register with the notches 31, said lugs extending rearwardly beyond the rear spoke flange 12. Preferably and as herein shown, the said lugs extend radially outwardly upon the rear spoke flange 12 in order to provide stock to give ample strength to the lugs. As a further improvement, the inner faces 34 of said lugs are arranged parallel with each other and a distance apart substantially equal to the largest diameter of the tapered or cone-like portion of the inner hub member, so as to thereby afford means for centering the outer hub member on the inner hub member and to facilitate the guiding of the lugs into the notches during the assembling of the hubs. In connection with the lugs thus arranged, the screw-thread of the locking ring 18 preferably terminates a distance short of the inner end of the locking ring so that the said inner end of the locking ring is interiorly cylindrical or non-screw threaded. The length of the lugs 33 is so proportioned with respect to the length of the cylindrical interior of the ring and the length of the screw-thread of the ring that, when the hub members are being assembled, the lugs 33 enter the notches 31 in advance of the engagement of the screw-thread of the locking ring with the screw-thread 17 of the inner hub member. Thus the said locking lugs 33 have the additional function of guide lugs to guide the members together, so that when said lugs find the notches the screw-threaded connection of the locking ring with the inner hub member may be readily effected. This arrangement also has the effect of centering the screw-threaded locking ring relative to the screw-threaded portion of the inner hub member, so that the screw-threaded connection may be effected without tendency of the screw-threads to clash or cross.

In order to prevent the locking ring 18 from becoming accidentally loosened or released I provide a locking device which may be made as follows. Said locking ring is provided on its periphery with a series of spaced notches and projections which desirably have the form of ratchet teeth 36, with the abrupt faces of said teeth facing in the direction opposite to which the locking ring is turned to lock the hub members together.

37 designates an endwise slidable locking latch that is seated in a suitable groove or way 38 formed in a thickened portion 39 of the outer spoke flange 13. The inner end 40 of said latch is shaped to conform to the ratchet teeth 36. The said latch is provided at its outer end with a lug or turned over portion 41 by which it may be raised out of engagement with the ratchet teeth or notches. The said latch is normally pressed toward and held in engagement with the ratchet teeth by a spring, against the action of which the latch is raised. I have herein shown a special form of spring 43 for this purpose (Fig. 4). Said spring has the general shape of the letter C and is contained in a suitably shaped recess 44 in the thickened portion of the spoke flange at one side of the latch 37. One end of said spring is fastened at 45 to the thickened portion of the flange, and the other end 46 of said spring extends from said recess 44 into engagement with a notch at one edge of the locking latch. The tendency of the spring is also to force the upper or outer end of the latch away from the spring. I utilize this latter effect of the spring to lock the latch in its retracted position by providing the latch on the edge thereof opposite to the spring with a shoulder or hook 48 which, when the latch is lifted, engages over the outer face of the thickened portion of the spoke flange. Thus the latch bar when raised is automatically forced into and held in its unlocking position. When the locking ring is turned rearwardly to force the hub members into wedging engagement the latch bar is released so as to be forced by the spring 43 against the locking teeth or projections 36, and said teeth force the latch outwardly as the locking ring is being turned into locking position so that the latch rides freely over said teeth. The engagement of the latch bar with the abrupt faces of the teeth prevents reverse rotation of said locking ring so long as the latch bar is in its normal locking position.

The construction of the hub shown in Figs. 6, 7 and 8 is like the hub before described except as to variations required for applying a brake drum or a driving sprocket thereto. As shown in said latter figures, the inner hub member is provided at its rear end face with an integral brake drum or sprocket wheel flange 50. In the present instance a brake drum 51 is shown as riveted to said flange. The said flange 50 is shown as provided with openings 52 to receive the lugs 33 of the outer hub member, in the same manner that the notches 31 of the inner hub member as shown in Figs. 1 and 2 receive the lugs 33. The said flange 50 is also provided with a series of openings 55 to receive the nuts of the bolts 14' by which the spokes are clamped between the flanges 12 and 13.

The structural details of my invention are capable of variations within the spirit and scope of my invention and the invention is not limited to such details except as such limitations are imposed by the prior art. For instance, the hub may be adapted to wire wheels with the necessary changes in structural details as to adapt my invention thereto.

I claim as my invention:—

1. In a hub for a demountable wheel, an inner and an outer hub member fitted one over the other and provided with complemental interlocking parts, a rotative locking member screw-threaded to one of the hub members and engaging the other and provided with a series of ratchet teeth, a locking device, and a spring to normally hold it engaged with the ratchet teeth to prevent rotation of the locking member in the unlocking direction, said spring being arranged to exert lateral pressure on the locking device to hold said locking device in unlocking position.

2. In a hub for a demountable wheel, an inner and an outer member fitted one over the other and provided with complemental surfaces, a locking ring screw-threaded to the inner member to lock said members together, said locking ring being provided with an annular series of notches, a latch bar slidably mounted in a way in the hub and provided at one side with a shoulder adapted, when withdrawn, to engage a shoulder on the hub to hold the bar away from said notches and a spring applied to the latch bar and arranged to exert endwise and lateral pressure on said latch bar.

3. In a hub for a demountable wheel an inner member and an outer member fitted one over the other and provided with complemental, engaging surfaces, and having locking means detachably fitted to one member and bearing against a shouldered part of the other member, the rear end of one of the members being provided with angularly spaced notches, and the rear end of the other member being provided with guiding and locking lugs to engage said notches, said lugs being of a length and so relationed to the locking means as to enter said notches in advance of operative engagement of said locking means with the member to which it is detachably fitted, and the locking means having guiding means which operate to guide the locking means into place as the lugs enter said notches.

4. In a hub for a demountable wheel, an inner member and an outer or socket member removably fitted thereover and adapted to be separated therefrom in demounting the wheel, a locking ring screw-threaded to the inner hub member and adapted to engage a shoulder on the outer hub member, the inner member being provided at its rear end with angularly spaced notches and the rear end of the outer member being provided with locking lugs of a length to enter said notches in advance of the screw-threaded engagement of the locking ring with the inner hub member, and the inner end of the ring having a non-screw-threaded guiding for centering surface.

5. In a hub for a demountable wheel, an inner member formed with a cone-like periphery, an outer member fitted thereover and formed with an interior surface complemental to and adapted to engage said cone-like periphery, a locking ring screw-threaded to the inner member and engaging the outer member to lock said members with their cone-like surfaces wedged together, a said outer member being provided at its rear end face with guide and locking lugs adapted to engage notches at the rear end face of the inner member, said lugs being of a length to enter said notches in advance of the screw-threaded engagement of the locking ring with the said inner member.

6. In a hub for a demountable wheel, an inner member formed with a cone-like periphery, and provided at the smaller end of said cone-like periphery with a screw-thread, an outer member fitted thereover and formed with an interior surface complemental to and adapted to engage said cone-like periphery, a screw-threaded locking ring engaging said screw-thread to force said members together with their cone-like surfaces in wedging engagement, the rear end of the locking ring being interiorly smooth or non-screw-threaded, and locking and guiding lugs at the rear end of the outer member to engage notches at the rear end of the inner member, said lugs being of a length as to enter the said notches in advance of the threaded engagement of the locking ring with the screw-thread of the inner hub member.

In testimony, that I claim the foregoing as my invention I affix my signature in the presence of two witnesses, this 9th day of December, A. D. 1911.

THOMAS I. DUFFY.

Witnesses:
W. L. HALL,
G. E. DOWLE.

---

It is hereby certified that in Letters Patent No. 1,076,558, granted October 21, 1913, upon the application of Thomas I. Duffy, of Chicago, Illinois, for an improvement in "Hubs for Demountable Wheels," an error appears in the printed specification requiring correction as follows: Page 4, line 33, for the word "for" read *or;* and that the said Letters Patent should be read with this correction therein that the same may conform to the record of the case in the Patent Office.

Signed and sealed this 18th day of November, A. D., 1913.

[SEAL.]

R. T. FRAZIER,

*Acting Commissioner of Patents.* inner member and an outer member fitted one over the other and provided with complemental, engaging surfaces, and having locking means detachably fitted to one member and bearing against a shouldered part of the other member, the rear end of one of the members being provided with angularly spaced notches, and the rear end of the other member being provided with guiding and locking lugs to engage said notches, said lugs being of a length and so relationed to the locking means as to enter said notches in advance of operative engagement of said locking means with the member to which it is detachably fitted, and the locking means having guiding means which operate to guide the locking means into place as the lugs enter said notches.

4. In a hub for a demountable wheel, an inner member and an outer or socket member removably fitted thereover and adapted to be separated therefrom in demounting the wheel, a locking ring screw-threaded to the inner hub member and adapted to engage a shoulder on the outer hub member, the inner member being provided at its rear end with angularly spaced notches and the rear end of the outer member being provided with locking lugs of a length to enter said notches in advance of the screw-threaded engagement of the locking ring with the inner hub member, and the inner end of the ring having a non-screw-threaded guiding for centering surface.

5. In a hub for a demountable wheel, an inner member formed with a cone-like periphery, an outer member fitted thereover and formed with an interior surface complemental to and adapted to engage said cone-like periphery, a locking ring screw-threaded to the inner member and engaging the outer member to lock said members with their cone-like surfaces wedged together, a said outer member being provided at its rear end face with guide and locking lugs adapted to engage notches at the rear end face of the inner member, said lugs being of a length to enter said notches in advance of the screw-threaded engagement of the locking ring with the said inner member.

6. In a hub for a demountable wheel, an inner member formed with a cone-like periphery, and provided at the smaller end of said cone-like periphery with a screw-thread, an outer member fitted thereover and formed with an interior surface complemental to and adapted to engage said cone-like periphery, a screw-threaded locking ring engaging said screw-thread to force said members together with their cone-like surfaces in wedging engagement, the rear end of the locking ring being interiorly smooth or non-screw-threaded, and locking and guiding lugs at the rear end of the outer member to engage notches at the rear end of the inner member, said lugs being of a length as to enter the said notches in advance of the threaded engagement of the locking ring with the screw-thread of the inner hub member.

In testimony, that I claim the foregoing as my invention I affix my signature in the presence of two witnesses, this 9th day of December, A. D. 1911.

THOMAS I. DUFFY.

Witnesses:
W. L. HALL,
G. E. DOWLE.

---

It is hereby certified that in Letters Patent No. 1,076,558, granted October 21, 1913, upon the application of Thomas I. Duffy, of Chicago, Illinois, for an improvement in "Hubs for Demountable Wheels," an error appears in the printed specification requiring correction as follows: Page 4, line 33, for the word "for" read *or;* and that the said Letters Patent should be read with this correction therein that the same may conform to the record of the case in the Patent Office.

Signed and sealed this 18th day of November, A. D., 1913.

[SEAL.]

R. T. FRAZIER,

*Acting Commissioner of Patents.*

It is hereby certified that in Letters Patent No. 1,076,558, granted October 21, 1913, upon the application of Thomas I. Duffy, of Chicago, Illinois, for an improvement in "Hubs for Demountable Wheels," an error appears in the printed specification requiring correction as follows: Page 4, line 33, for the word "for" read *or;* and that the said Letters Patent should be read with this correction therein that the same may conform to the record of the case in the Patent Office.

Signed and sealed this 18th day of November, A. D., 1913.

[SEAL.] R. T. FRAZIER,

*Acting Commissioner of Patents.*